United States Patent [19]

Pozzi

[11] Patent Number: 4,712,810
[45] Date of Patent: Dec. 15, 1987

[54] QUICK ACTION SELF-LOCKING PIPE FITTINGS

[76] Inventor: Gian C. Pozzi, Via Concordia, 4, 21040 Menzago di Sumirago (VA), Italy

[21] Appl. No.: 933,818

[22] Filed: Nov. 24, 1986

[30] Foreign Application Priority Data

Nov. 25, 1985 [IT] Italy ................................ 83626 A/85

[51] Int. Cl.⁴ ............................................. F16L 35/00
[52] U.S. Cl. ......................................... 285/93; 285/315; 285/340; 285/423; 285/921; 285/334.4; 285/150
[58] Field of Search .............. 285/340, 314, 150, 315, 285/308, 93, 423, 921, 334.4

[56] References Cited

U.S. PATENT DOCUMENTS

| | | | |
|---|---|---|---|
| 4,123,090 | 10/1978 | Kotsakis | 285/340 X |
| 4,593,943 | 6/1986 | Hama et al. | 265/340 X |
| 4,630,848 | 12/1986 | Twist | 285/340 X |

FOREIGN PATENT DOCUMENTS

| | | | |
|---|---|---|---|
| 1474023 | 3/1967 | France | 285/340 |
| 2060106 | 4/1981 | United Kingdom | 285/340 |

Primary Examiner—Dave W. Arola
Attorney, Agent, or Firm—Frost & Jacobs

[57] ABSTRACT

Described is an improved pipe fitting of the self-locking quick action type wherein the leakproof seal is provided by a forced insertion of the extremity of a pipe inside a conical seat without utilizing any gasket of resilient material and wherein the release of the pipe anchoring means may take place only rotating an external crown of a plug in a stable position visibly recognizable by alignment or off-setting of two external indexes.

9 Claims, 15 Drawing Figures

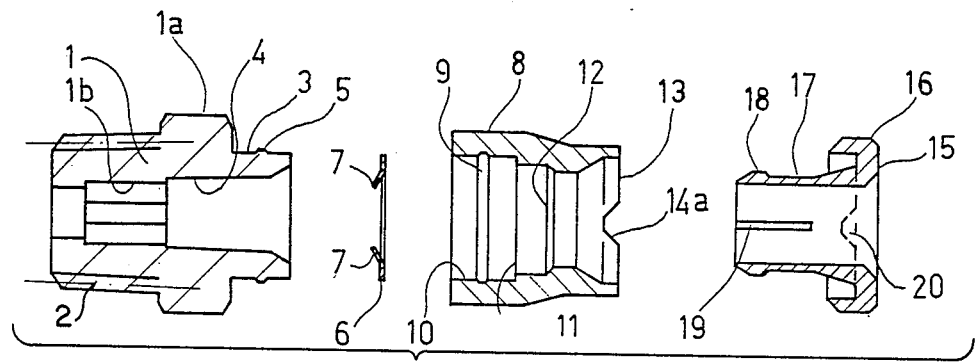
FIG. 1
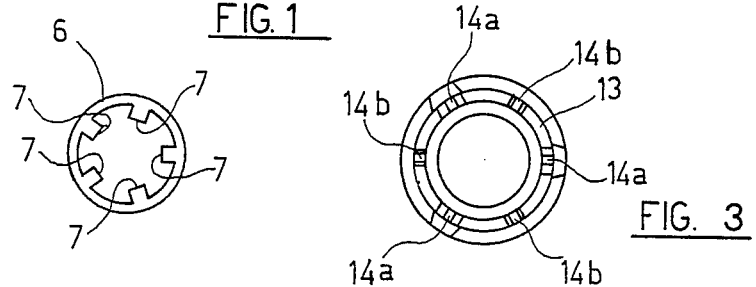
FIG. 2    FIG. 3
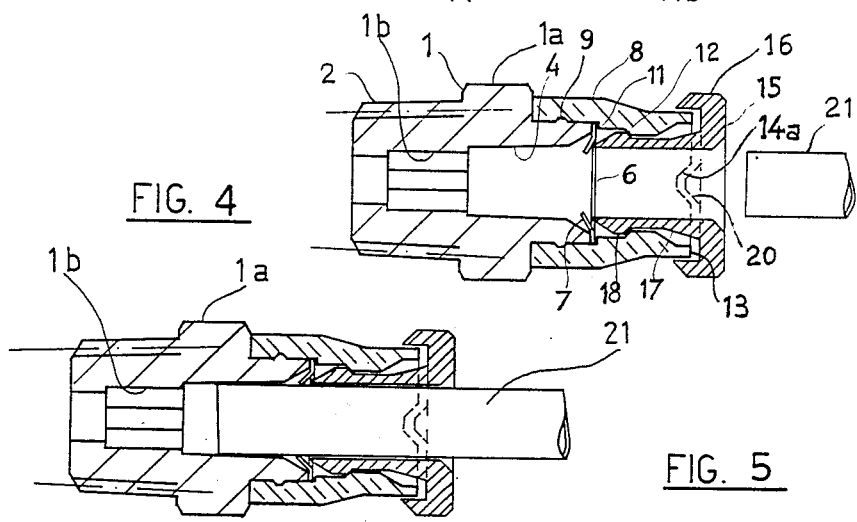
FIG. 4
FIG. 5
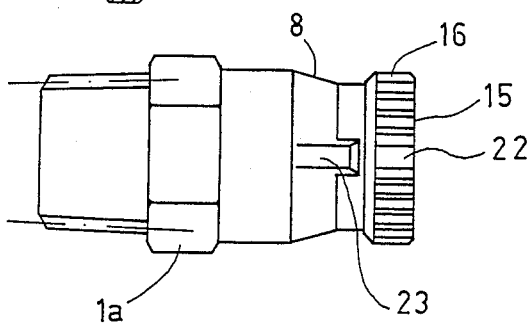
FIG. 6

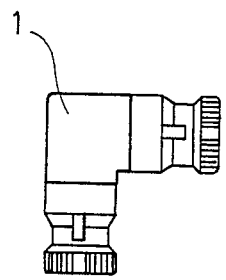
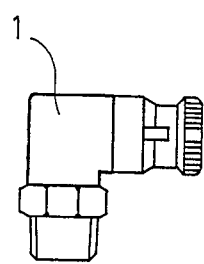
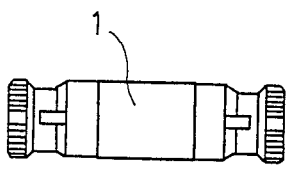
FIG. 7a  FIG. 7b  FIG. 8
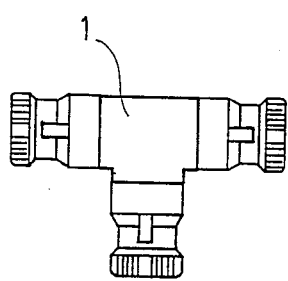
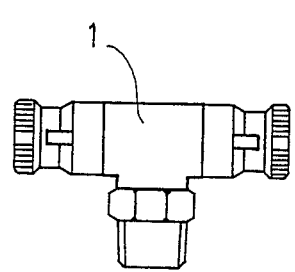
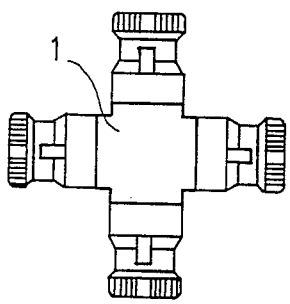
FIG. 9a  FIG. 9b  FIG. 10a
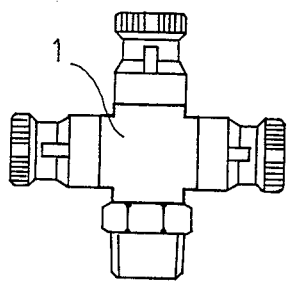
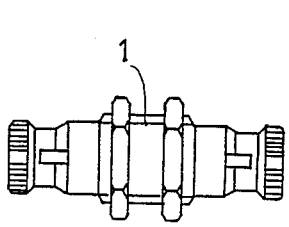
FIG. 10b  FIG. 11

QUICK ACTION SELF-LOCKING PIPE FITTINGS

The present invention relates, in general, to pipe fittings for pipings made with flexible, semirigid or substantially rigid pipes of plastic material or metal. More particularly the invention relates to fittings of the quick coupling type, that is of the type wherein the pipe is forcibly pushed inside the fitting for establishing the necessary leakproof joint and wherein it is automatically locked in such an engaged position by an elastic anchoring element having claws abutting against the outer surface of the pipe preventing its extraction unless acting upon suitable release means when the connection must be undone.

Fittings of this kind are widely used for making pneumatic and oleodynamic systems, in laboratories and in fluids conveyance systems utilizing tubes of small or medium diameter.

The quick action fittings of known types utilize a "O-ring" fitted in an appropriate seat of an internal cylindrical surface of the fitting in order to establish a leakproof seal with the external cylindrical surface of a pipe (of compatible diameter) forcibly inserted into the fitting. The anchoring element is commonly represented by an elastic washer, suitably housed inside the fitting in an outer axial position with respect to the position of the "O-ring" gasket, and having a plurality of radial teeth or claws extending inward from the inner circumference of the ring of the washer for a distance sufficient to have them engaged by the pipe pushed inside the fitting and from this flexed towards the interior of the fitting in such a way that when the insertion of the pipe is completed the tips of such claws abut against the external surface of the pipe with a certain angle of incidence thus preventing it from being pulled back out.

The means for releasing the grip are typically formed by a cylindrical sleeve inserted inside the fitting and extending outside the rim of the fitting's nipple and through which passes the pipe inserted in the fitting. Such a sleeve though being prevented from coming out of the fitting by suitable retaining means, may be pushed towards the interior of the fitting in order that its internal rim push on the claws of the elastic washer flexing them further towards the interior of the fitting until releasing their grip on the external surface of the pipe which may be thus easily pulled out of the fitting.

The prior art fittings have different disadvantages and present some non-negligeable problems during the assembling of the pipings as well as in relation to maintaining a leakproof seal in time.

Firstly, the type of sealing utilized, i.e. "O-ring" type, imposes a careful handling of the pipes in order to preserve an accurate cylindrical shape and freedom from abrasions and scratches of the end of the pipe which must be inserted in the fitting. This often requires a repeated clipping of the pipe until achieving the desired leakproof seal.

A second disadvantageous aspect of the prior art fittings is due to the fact that the sealing element is necessarily made of a resilient material essentially different from the material forming the fitting and the pipe. Such a resilient gasketing material must therefore possess the necessary chemical inertness in respect of the particular fluid conveyed besides the resistance to the particular temperature of operation, further it tends to loose the original resilience characteristics with time, thus often causing leaks from the joint.

Furthermore, the means for releasing the grip on the pipe inserted in the fitting may be acted upon erroneously or accidentally.

A main objective of the present invention is, therefore, to provide a quick action self-locking fitting more convenient in use of the prior art fittings and free of the above mentioned drawbacks and inconveniences of such known fittings.

These objectives and advantages are accomplished by the quick action self-locking fitting made in accordance with the present invention wherein the desired leakproof seal is made without utilizing any resilient gasketing element but simply by compression of the pipe end inside a conical seat of the fitting and wherein the means for releasing the grip on the pipe inserted in the fitting have at least two stable positions allowing the extraction of the pipe from the fitting only when they are in one of said two positions.

Essentially the quick action self-locking fitting of the present invention comprises a suitable hollow body which may assume different forms, as it will be described later, having at least a tubular projection or nipple, said nipple having, on at least a portion of its length, an internal truncated cone surface (conical seat) with its major base oriented towards the external aperture of said nipple and apt to form a seal directly against the rim of a pipe pushed inside said nipple of the fitting and having an external cylindrical surface provided with at least a collar;

an elastic anchoring washer placed on the rim of said nipple and provided with a plurality of claws radially extending from its inner circumference and long enough to be flexed elastically towards the interior of the fitting by said pipe preventing extraction of the latter;

an outer tubular sleeve snapped on said nipple until receiving said collar in a suitable seat on the internal surface of said outer sleeve, the internal surface of said outer sleeve being provided with a first gorgerin or step blocking said elastic washer against the rim of said nipple in correspondence of the outer perimeter of said washer;

a plug formed by a crown and a tubular appendix having a cylindrical central hole of diameter sufficient to allow said pipe to pass through the plug, said plug, by means of said appendix, being forced inside said sleeve by forcing a collar of said tubular appendix beyond a second step of the internal surface of said sleeve in such a way that the crown of the plug remains outside said sleeve;

means in said plug and said sleeve allowing an axial displacement of said plug relative to said sleeve by rotating the plug by means of said external crown between at least two distinct angular positions thereof in such a way that, in a first angular position said plug is advanced inside said sleeve until the rim os said tubular appendix elastically flexes the claws of said washer further towards the interior of the fitting, diverging them and freeing said pipe so that it may be pulled out, and in a second angular position said plug is retracted and cannot be pushed inside said sleeve.

Preferably said cooperating means in said plug and in said sleeve comprise, respectively, beadings or projections on the face of said crown opposing said sleeve and indentations on the rim of said sleeve. More preferably said beadings are in number of three angularly spaced at 120° one from the other while the rim of said sleeve is provided with three relatively deep indentations angularly spaced at 120° one from the other and with three relatively shallow indentations intermediate to said deeper indentations.

The invention and his advantages will appear more evident through the detailed illustration of a particularly preferred embodiment of the fitting of the invention also by means of the annexed drawings wherein:

FIG. 1 is an exploded cross section view of the parts forming a fitting according to the invention;

FIG. 2 is a lateral view of the anchoring washer of the pipe;

FIG. 3 is a lateral view of a particular aspect of the fitting of FIG. 1;

FIG. 4 is a cross section view of the assembled fitting of FIG. 1;

FIG. 5 is a cross section view of the fitting of FIG. 4 with a pipe inserted into the fitting;

FIG. 6 is a lateral view of the fitting of the preceding Figures;

FIGS. 7a-11 show various types of fittings made in accordance with the present invention;

Figure 12:
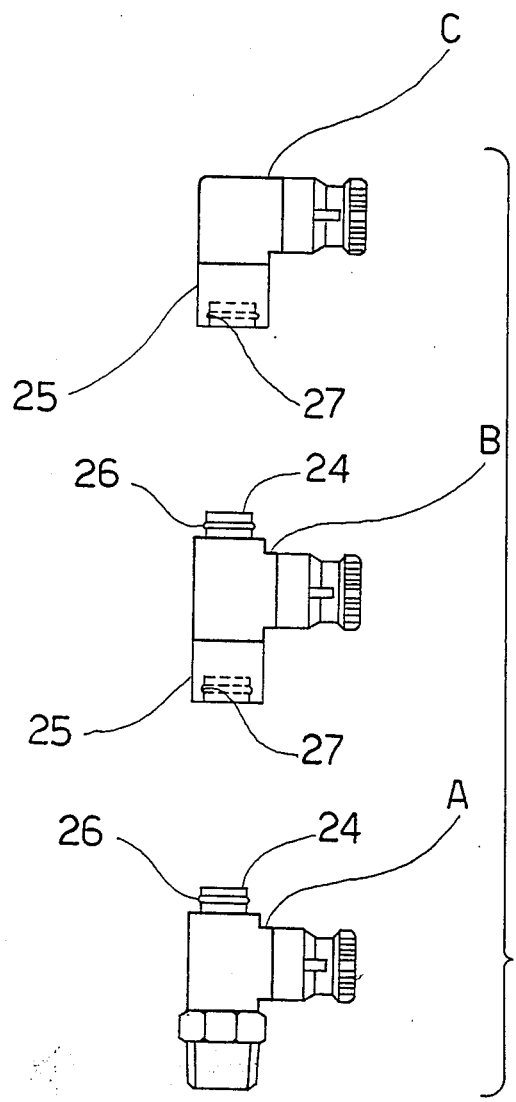
FIG. 12 shows fittings of the invention of a modified type which allows coupling of two or more fittings together.

The pipe fitting shown in FIG. 1 is composed of a hollow body 1 which, in the embodiment shown, has an extremity 2 provided with a conical thread for sealingly screwing into a threaded hole of a vessel or of a manifold or of a threaded sleeve etc. and a tubular extension or nipple 3 having an internal truncated cone surface 4 (conical seat) and at least a collar 5 on the external cylindrical surface of said nipple; of an elastic anchoring washer 6 provided with a plurality of radial teeth or claws 7 projecting towards the interior from the inner circumference of the washer's outer ring; of a sleeve 8 having a seat 9 in a first internal cylindrical surface 10, a first gorgerin or right angle step 11, a second gorgering or step 12, preferably tapered, and an external rim 13 having a number of indentations 14a (14b) evenly distributed along the rim's circumference; and of a plug 15 formed by a crown 16 and a tubular appendix 17, the latter having a relief portion in the shape of a collar 18 near its inner extremity. Preferably the tubular appendix 17 of the plug has one or more, preferably two, longitudinal cuts 19 extending from its internal extremity for a considerable portion of its length, while on the face of the crown 16 opposed to the rim of said sleeve there are a number of beadings or projections 20 evenly distributed along the circumference.

The body 1, in the particular embodiment shown, is provided both with an external hexagon 1a permitting the use of a normal spanner for turning the body 1 as well as an internal hexagon 1b allowing, alternatively, to use a hexagonal wrench instead of the normal external spanner.

The conicity (i.e. the angle comprised at the vertex by two diametrically opposed generatrices of the internal truncated cone surface 4 of the body 1), is preferably comprised between 3° and 4° even though conicities slightly greater or slightly lower than said preferred limits may be used without particular problems.

FIGS. 2 and 3 are respectively lateral views of the pipe gripping elastic washer 6 (FIG. 2) and of the external rim 13 of the sleeve 8 (FIG. 3). In this latter Figure is shown the disposition along the circumference of the rim of the sleeve of the plurality of radial indentations 14a and 14b. The indentations 14a are deeper than the indentations 14b interposed to the first ones.

FIG. 4 shows the assembled fitting.

The same numerals are used for indicating the same parts in all Figures.

As it may be observed from the Figure the assembly of the various parts forming the fitting takes place by firstly placing the washer 7 on the rim of the nipple 3 of body 1 of the fitting. The sleeve 8 is then snapped-on by exerting a compression force sufficient to bring the collar 5 of the nipple 3 of the body of the fitting into the relative seat 9 of the first internal cylindrical wall of the sleeve 8. The first right angle step 11 of the internal surface of the sleeve 8 comes to abut against the peripheral surface of the washer 6 thus providing to block the washer 6 in position. Finally the plug 15 is inserted inside the sleeve 8 by exerting a compression sufficient to bring the collar 18 beyond the tapered step or relief 12 which prevents extraction of the plug. The subsequent longitudinal cuts 19 of the tubular appendix of the plug 15 favour a certain elastic constriction of the tubular appendix of the plug during its forced insertion inside the sleeve 8. At the same time the beadings 20 on the internal surface of the crown 16 of the plug 15 will abut either against the outermost edge of the rim 13 of the sleeve 8 or in one or in the other of the indentations 14a and 14b present on such a rim 13. The relative dimensions of the matching between the sleeve 8 and the plug 15 are such that the tapered step 12 exerts a certain elastic pull action towards the interior of the fitting upon the collar 18 of the plug 15 when the beadings 20 are not inside the deep indentations 14a. The pull-in action is favoured by the ability of the tubular appendix 17 to be elastically constricted by virtue of the longitudinal cuts 19.

As it may be easily observed, the assembly is such that the parts composing it are assembled through a snap-on action one into the other and, though maintaining the ability to rotate one with respect to the others and, for what concerns the plug 15 of being able to assume at least two different pre-determined stable axial positions, are no longer separable.

Such an assembly system of the fittings of the invention does not require tools and/or special implements as it is commonly the case instead with the state of the art fittings and represents a non-negligeable advantage with respect to the latter.

The fitting is now ready to receive a pipe 21 having an external diameter compatible with the diameter of the particular coupling. In FIG. 5 is shown the pipe 21 stably coupled in a leakproof manner to the connector by pushing the pipe itself with a sufficient force inside the conical seat.

The pipe 21 (of diameter compatible with the particular fitting) is inserted through the cylindrical hole of the plug 15 which has a diameter such as to conveniently act also as a guide for the pipe being inserted. The pipe 21 is pushed inside the conical seat 4 of body 1 of the fitting exerting a compression sufficient to establish a perfect leakproof seal of the connection. The moderate conicity of the seat favours a gradual compression of the external edge of the rim of the pipe 21 facilitating a perfect conformation between the contacting surfaces even in case of imperfect cuts of the pipe itself. Upon isertion the pipe 21 flexes elastically the radial claws 7 of the elastic anchoring washer 6 towards the interior of the fitting with respect to their rest inclination; when insertion is completed the tips of the radial claws 7 will result abutting with a certain incidence angle against the external surface of the pipe 21 as to prevent its retraction.

When desiring to pull out the pipe thus inserted into the fitting, the plug 15 will be rotated until allowing the beadings 20 to fall into the deep indentations 14a of the rim of the sleeve 8, preferably, under a certain pull-in action exerted by the tapered step 12 on the collar 18 of the tubular appendix 17 of the plug 15 favoured by a certain capacity of constriction of the tubular appendix 17 by virtue of the longitudinal cuts 19.

In this position, the rim of the tubular appendix 17 comes near the inclined claws 7 of the pipe anchoring washer and a slight pressure on the external crown 16 of the plug 15 is sufficient for the rim of the tubular appendix 17 to push the claws of the anchoring washer to open themselves more thus freeing the pipe 21 which may be easily disconnected by simply pulling it out. Of course the deep indentations 14a are sufficiently deep for allowing such a final forced advancement of the plug 15 inside the fitting in order to free the pipe from the grip exerted by the claws 7.

Conveniently, as shown in FIG. 6, on the respective lateral surfaces of the crown 16 of plug 15 and of the sleeve 8 there are suitable indexes, e.g. in the form of projections or indentations, 22 and 23 apt to visibly showing the actual position of the plug 15. Moreover the crown 16 may have a grooved surface for facilitating its rotation to the desired position.

The shallow indentations 14b intermediate to the deep indentations 14a have the sole objective of determining, in the rotation movement of the plug 15 with the beadings 20 outside the deep indentations 14a, an equal number of certain angular positions such that the external indexes 22 and 23 result either positively offset or aligned in order to make more easily recognizable the actual position of the plug.

Therefore by placing the plug 15 in its "safety" position, e.g. with its beadings in the shallow indentations 14b easily recognizable by the relative offset position of the external indexes 22 and 23, the joint can't be undone following, for example, an erroneous intervention. Only by rotating the plug until, for example, aligning the external indexes 22 and 23, the connection may be undone. This represents a further improvement with respect to the fittings of the state of the art.

Another extremely advantageous aspect of the pipe anchoring system of the fittings of the invention is represented by the fact that when the plug 15 is in its stable backed "safety" position, that is with the beadings 20 in the shallow indentations 14b, the collar 18 of the tubular appendix 17 forces against the tapered step 12 of the internal surface of the sleeve 8 and determines a constriction of the diameter of the tubular appendix 17 (favoured by the longitudinal cuts thereof 19). In practice the terminal portion of the appendix 17 clasps the external surface of the pipe 21 inserted into the fitting effectively acting as a vice on the pipe itself. This blocking action on the pipe is stably maintained by the plug 15 until it is rotated into its "release" position, that is when the beadings 20 are aligned with and allowed to fall into the deep indentations 14a.

Such a blocking action is extremely effective in preventing accidental disengagements of the pipe from the grip of the claws of the anchoring washer under strong vibrations possibly transmitted to the pipe during operation of the plant or of the machine, besides constituting, in any case, a positive additional safety factor upon the stability of the joint.

The fitting according to the present invention may be fabricated with different materials each one suitable to particular applications. Therefore the fittings may be fabricated with metallic materials or with resins with the exception of the anchoring washer 6 which may be metallic in all instances. Manufacturing the fittings of the invention with thermo-plastic resins is particularly preferred for all applications wherein such materials are suitable in so far it permits manufacturing by molding of of the various parts forming the fitting without requiring any machining.

Of course the choice of the particular thermo-plastic resin may depend, in a large measure, upon the type of application and of conveyed substance. Suitable are therefore all moldable thermo-plastic resins such as for example: polyvinyl acetate, polyamide and polycarbonate resins, modified PTFE (moldable), polyvinylidene-fluoride, polypropylene, poly-ethylene, PVC, etc.

It is further intended that the fittings according to the invention may assume different shapes, in particular the body 1 of the fitting may have different shapes and have more nipples for the connection of so many pipes.

In FIGS. 7a, 7b, 8, 9a, 9b, 10a, 10b and 11 are shown different types of fittings in accordance with the present invention wherein the body 1 assumes, every time, a different shape.

A possible advantageous embodiment of the fittings of the invention, shown in FIG. 12, contemplates the possibility, for different fittings (A, B and C), to be force coupled one with the other in such a way as to form a distributor or manifold provided with an unlimited number of connection points with so many branch pipes.

Fittings of this type are provided with a male (24) or a female (25) coupling means. Coupling takes place by forcing the male terminal 24 of one fitting inside the female seat 25 of another fitting until bringing the sealing collar 26 of the male terminal to fit in the appropriate seat 27 formed by a circular groove in the internal cylindrical surface of the female terminal 25.

Such an embodiment of the fittings of the invention is particularly suitable in the case the fittings be fabricated with plastic material.

Though only few particularly preferred embodiments of the fitting of the invention have been illustrated, it is intended that modifications may be made by the expert technician though remaining within the scope of the invention. In particular other means may be utilized for forcing, by rotating it, the plug 15 in two distinct stable axial positions, for example a short length of helical groove on the internal surface of the sleeve 8 co-operating with a matching projection of the external wall of the tubular appendix 17 of the plug may be utilized as an alternative to the system described in the Figure.

Alternately such a helical type coupling between the plug 15 and the sleeve 8 could also be realized between the external surface of the sleeve and a sufficiently elongated inner surface of the external crown 16 of the plug in a manner easily understood by an expert technician.

In accordance with these latter possible embodiments of the fittings of the invention, the plug may be advanced until parting the claws of the pipe anchoring washer simply rotating the plug until a certain stable position to which it will correspond the appropriate alignment of the external indexes for indicating that the plug has reached the "release" position and that the pipe may be pulled out of the fitting. A counter rotation (or a further rotation of the plug) will make the plug to back again to its "safety" position. Such an alternative way to realize the anchoring and releasing system of the fitting of the invention may contemplate allowing the pulling out the pipe without necessarily having to exert any pressure on the plug. This may result advantageous in case of joints located in places difficult to reach allowing to undo the connection using only one hand.

What I claim is:

1. A quick action, lockable and releasable fitting for connecting a pipe or tube to a coupling body, said fitting comprising a hollow body having at least a nipple, said nipple having an internal truncated cone surface with the major base facing towards the external opening of said nipple making a leakproof seal with an end of a pipe when the latter is pushed inside said nipple, and an external cylindrical surface provided with at least a collar and terminating in a rim;

an elastic anchoring washer placed on said rim of said nipple and provided with a plurality of claws projecting radially inward from its inner circumference and long enough to be elastically flexed towards the interior of the coupling by said pipe and to abut against the external surface of said pipe preventing it from being pulled out;

a sleeve having a seat in the internal surface thereof and adapted to be forceably snapped-on said nipple until said collar on said nipple is received in said seat, the internal surface of said sleeve being further provided with a first step blocking said elastic washer against said rim of said nipple, and with a second step;

a plug having a crown and a tubular appendix terminating in a collar and having a central cylindrical hole of diameter sufficient to permit passage of said pipe through the plug, said plug by means of said appendix being forceably snapped into said sleeve by forcing said collar of said tubular appendix beyond said second step of the internal surface of said sleeve a distance such that the crown of the plug remains outside the sleeve;

cooperating means in said plug and in said sleeve for allowing or preventing an axial displacement of said plug with respect to said sleeve by rotating the plug, by means of said external crown, between at least two distinct angular position in such a way that, when in a first angular position, said plug may advance towards the interior of said sleeve until the rim of said tubular appendix flexes elastically the claws of said washer further towards the interior of the fitting parting said radially projecting claws and freeing said pipe so that it may be pulled out, and, when in a second angular position, said plug is backed out and prevented from being pushed further inside said sleeve and said claws abut against the external surface of said pipe at an angle such as to prevent withdrawal of said pipe.

2. The pipe fitting of claim 1 wherein the conicity of said internal truncated cone surface is comprised between 3° and 4°.

3. The fitting in accordance with claim 1 wherein said tubular appendix of said plug is provided with at least one longitudinal cut of its tubular wall.

4. The fitting in accordance with claim 3 wherein, when the plug is in said second angular position, said collar of the tubular appendix of the plug has a diameter such as to cause it to forcibly bear against said second step of the internal surface of the sleeve causing a constriction of the tubular appendix having said at least one longitudinal cut against the external surface of the pipe inserted into the fitting.

5. The fitting in accordance with claim 1 wherein said co-operating means in said plug and said sleeve are angularly spaced beadings and indentations on opposed surfaces, respectively, of said plug and of said sleeve.

6. The fitting in accordance with claim 5, wherein said sleeve has an indented outer rim with three deep indentations, angularly spaced by 120° one from the other, and three shallow indentations intermediate to said three deep indentations;

the crown of said plug has three beadings, spaced by 120° one from the other, abutting on said indented outer rim of said sleeve;

a first angular position of said plug being determined by said beadings of the crown of said plug falling into said deep indentations of the outer rim of said sleeve; and a second angular position of said plug being determined by said beadings falling into said shallow indentations intermediate to said three deep indentations of the outer rim of said sleeve.

7. The fitting in accordance with claim 6 wherein said two angular positions of said plug are visibly indicated by means of alignment or off-setting of an index on said sleeve and a registering index on said plug, said indices being in the form of projections or indentations.

8. The fitting in accordance with claim 1 wherein all its component parts are made of thermo-plastic resin with the exception of said clawed washer which is metallic.

9. The fitting in accordance with claim 1 wherein said body is further provided with means for connecting one fitting to another by a snap-on action.

* * * * *